Feb. 14, 1967 H. C. LIKEL 3,304,500

FSK SYSTEM INCLUDING MEANS FOR DISTRIBUTING DATA PULSES INTO TWO CHANNELS TO MODULATE TWO SEPARATE CARRIER FREQUENCIES

Filed April 3, 1963 6 Sheets-Sheet 1

INVENTOR.
HARRY C. LIKEL

BY J. B. Burke

ATTORNEY

FSK SYSTEM INCLUDING MEANS FOR DISTRIBUTING DATA PULSES INTO TWO CHANNELS TO MODULATE TWO SEPARATE CARRIER FREQUENCIES

Filed April 3, 1963 6 Sheets-Sheet 2

INVENTOR.
HARRY C. LIKEL
BY J. B. Burke
ATTORNEY

Feb. 14, 1967 H. C. LIKEL 3,304,500

FSK SYSTEM INCLUDING MEANS FOR DISTRIBUTING DATA PULSES INTO TWO CHANNELS TO MODULATE TWO SEPARATE CARRIER FREQUENCIES

Filed April 3, 1963 6 Sheets-Sheet 3

INVENTOR.
HARRY C. LIKEL

BY J. B. Burke

ATTORNEY

FSK SYSTEM INCLUDING MEANS FOR DISTRIBUTING DATA PULSES INTO TWO CHANNELS TO MODULATE TWO SEPARATE CARRIER FREQUENCIES

Filed April 3, 1963 6 Sheets-Sheet 4

INVENTOR.
HARRY C. LIKEL
BY J. B. Burke
ATTORNEY

INVENTOR.
HARRY C. LIKEL
BY J. B. Burke
ATTORNEY

Feb. 14, 1967 H. C. LIKEL 3,304,500

FSK SYSTEM INCLUDING MEANS FOR DISTRIBUTING DATA PULSES INTO TWO CHANNELS TO MODULATE TWO SEPARATE CARRIER FREQUENCIES

Filed April 3, 1963 6 Sheets-Sheet 6

INVENTOR.
HARRY C. LIKEL

BY J. B. Burke
ATTORNEY 3,304,500

FSK SYSTEM INCLUDING MEANS FOR DISTRIBUTING DATA PULSES INTO TWO CHANNELS TO MODULATE TWO SEPARATE CARRIER FREQUENCIES

Harry C. Likel, Brooklyn, N.Y., assignor to Western Union Telegraph Company, New York, N.Y., a corporation of New York Filed Apr. 3, 1963, Ser. No. 270,438
2 Claims. (Cl. 325—59)

Various types of computers and other business machines are adapted to produce or receive data signals having a variety of speeds, or frequency rates. On the other hand, the transmission facilities of communication companies which are used to transmit such data signals have been standardized into so-called "voice band units" each having a useful band width of approximately 3,000 cycles, or multiples or sub-multiples thereof. The carrier channelizing equipments in which these voice frequency bands terminate have been standardized insofar as possible to accommodate currently widely used telegraphic devices. For the transmission of high speed data signals over standard voice frequency bands it has become necessary to provide translating equipment between the data terminals and the transmission lines. The equipment must accept digital signals, either single or polar, from patrons' business machines and must transmit these signals as modulated carrier signals over a voice frequency band or one or more sub-channels derived from a voice frequency band. A data channel terminal has been devised to meet these specific needs.

This terminal accepts digital signals over a single circuit from a patron at a 2400-baud rate and adapts these signals for retransmission over two 1200-baud carrier subchannels which are accommodated by a single voice frequency band. The terminal is able to utilize the provisionally standardized 1200-baud equipment which is suitable for many patrons' needs, to accommodate the patron who requires a 2400-baud service.

A data terminal as mentioned above may include two major equipment groups: the separating and combining apparatus for the transmitted and received digital signals on the patrons' side of the equipment, and the modulating equipment to produce the carrier signals on the carrier voice frequency band side. Thus, intermediate between the two combiners are four carrier transceivers. These transceivers are identical except that pairs of them employ differing carrier frequencies of 1100 and 2500 cycles respectively, for example, to adapt them to upper and lower sub-channels respectively of the voice frequency band. These transceivers may be of conventional type. They will receive and transmit 1200-baud digital signals as received from patrons. The present invention and the detailed description of the invention to follow is primarily concerned with the signal separating and combining apparatus but as much of the associated apparatus of the data terminal is described as is necessary to make clear the functions performed by the signal separating and combining apparatus.

Among the objects of the invention are: to provide an apparatus for converting signals from serial transmission to parallel transmission and vice versa; to provide an apparatus for transmitting the intelligence contained in a high speed keyed direct communication channel over two lower speed carrier channels; to provide transmitting apparatus as described wherein:

(a) The high speed signals are limited as to amplitude;

(b) Alternate pulses are directed into two sub-channels to provide fully developed signals each at one half the original speed;

(c) The pulses in the sub-channels are converted to polar configuration and are amplified for high speed modulation of separate frequency modulated carrier transmitters for the individual sub-channels;

(d) The modulated carrier signals are transmitted over a common line facility;

(e) The modulated signals from the common line facility are received, amplified and compensated for nonlinearities in attenuation;

(f) The two sub-channels are separated by means of filters;

(g) Inequalities in delay in either channel are compensated in either so that both sub-channels undergo the same delay;

(h) The two sub-channels are combined after detection into a single channel at twice the speed;

(i) The signals in the single channel are converted into polar configuration and amplified for transmission to the patron;

(j) Employment of a synchronous data timer which for transmission coordinates the generation of signals by the patron and their processing by the serial to parallel converter, and which for reception, synchronizes and phases with one sub-channel and controls processing of both sub-channels in the parallel to serial converter and the reception of the double speed signals by the patron.

The invention will be best understood from the following detailed description taken together with the drawings, wherein:

FIG. 1 is a block diagram of a data signal combiner according to the invention shown in association with a synchronous data timer and two transceivers;

FIG. 2 is a diagram indicating the manner in which

Figures 1, 2:
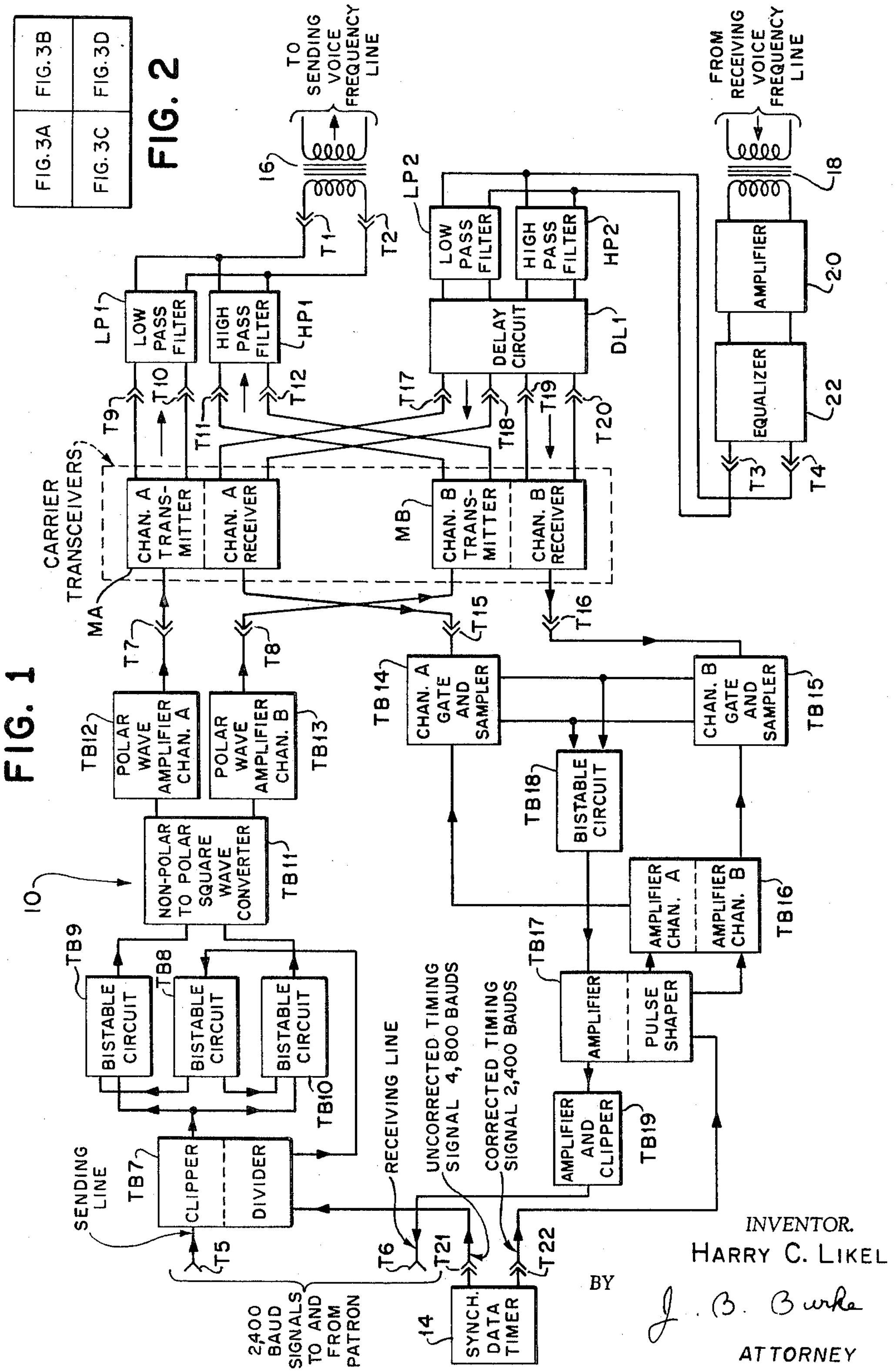
Figure 4:
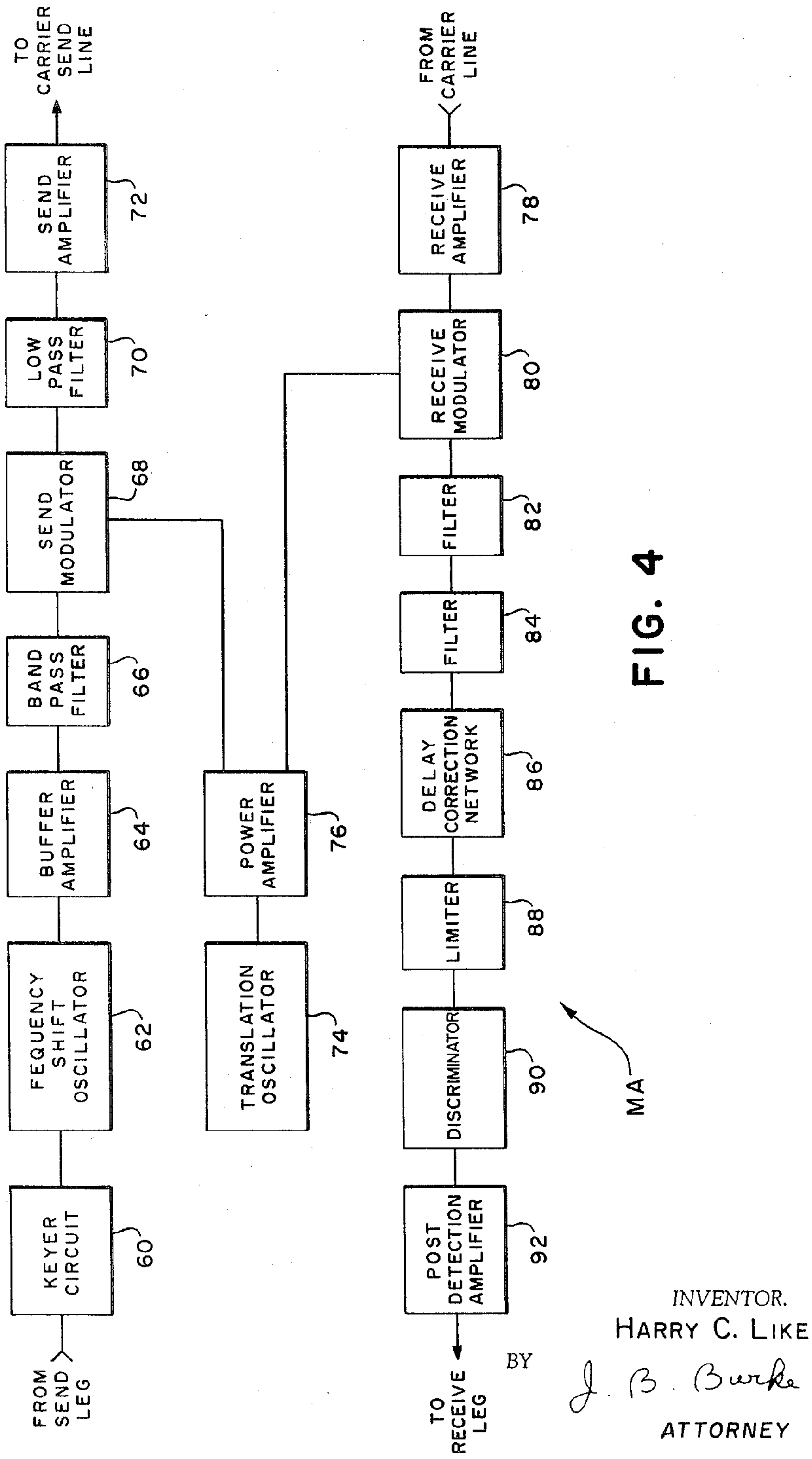

FIGS. 3A–3D taken together as indicated in FIG. 2 constitute a schematic diagram of the combiner;

FIG. 4 is a block diagram of a transceiver.

Referring first to FIG. 1 alone there are shown essential parts of a data transmitting terminal including the invention. For transmission of signals, the binary 2400-baud output from a patron's data transmitting equipment is applied over a send data leg at terminal T5 to the data terminal. The 2400-baud output is controlled by timing the information derived from a synchronous data timer 14. This output consisting of serial positive and negative bauds is applied to a circuit or terminal board TB7 of the data channel combiner 10, and is separated into two 1200-baud data streams by sending alternate bits to each of two 1200-band transceivers or modems MA and MB in subchannels A and B respectively. In the two transceivers, the marking (negative) and the spacing (positive) data pulses frequency-modulate a 7500-cycle per second carrier to 7100-cycle per second (marking) and 7900-cycle per second (spacing) respectively. Higher order sidebands are filtered out by band limiting filters in combiner 10. The signals in sub-channel A are then translated down to an 1100-cycle per second carrier by a modulator in transceiver MA, using a translation frequency of 8600 cycles per second. The signals in sub-channel B are translated down to a 2500-cycle per second carrier by a modulator in transceiver MB, using a translation frequency of 10,000 cycles per second. In each of the two transceivers the upper sideband of the translation process is suppressed by a low-pass filter. The lower sidebands, one from each transceiver, are applied to low-pass filter LP1 and high-pass filter HP1 in data channel combiner 10, and then pass via an optionally used line coupling transformer 16 to the voice facility.

For reception of signals through the data terminal, the incoming carrier signal from the voice facility is applied via an optionally used line coupling transformer 18 to a line amplifier 20 of conventional type for increasing the amplitude of the received signals. The amplifier output is applied to an equalizer 22 of conventional type, which corrects for amplitude and delay distortion. The carrier signals then pass through terminals T3, T4 of the data channel combiner where they are applied to a high-pass filter HP2 and a low-pass filter LP2. If necessary, delay is introduced into the circuit of one of the 1200-baud transceivers MA or MB by a delay circuit DL1 to equalize the propagation time of the two signals. The two carrier signals now leave the combiner and are applied to the two transceivers. The two transceivers translate the carrier signals back to 7500 cycles per second by a similar but inverse process to that used in the above-mentioned transmission process. Band limiting filters in the transceivers select the desired lower sideband of the translation process in each transceiver and suppress the undesired upper sideband and the 8600-cycle per second and 10,000-cycle per second translation frequencies. Amplitude variations are removed from the signal envelope by a limiter in each transceiver, and the modulation is recovered by a discriminator in each transceiver. The output of each discriminator is regenerated in amplitude by the post-detection amplifier, and is then fed into the receiving side of the combiner as polar digital signals. The two sub-channels are then combined into a serial 2400-baud data stream which is regenerated in time as well as amplitude by 2400-baud data stream terminal boards TB14 through TB19 of the data channel combiner for delivery over the receive data leg at terminal T6 to the patron's data receiving equipment.

Combiner 10 functions in both the transmitting and receiving sides of data channel terminal. In the transmitting side, the combiner separates the incoming digital information stream (2400 bauds) into two streams, each stream having half the bit rate (1200 bauds) of the original. The combiner receives timing information from the synchonous data timer assembly 14, that is relative to the timing of the incoming information bit stream. In the receiving side, the combiner recombines the two 1200-baud streams into a single information stream at the original bit rate (2400) bauds.

The combiner 10 includes a number of circuits mounted on individual panels or boards and referred to herein as "circuit boards," "terminal boards" or "boards." These terminal boards have been assigned circuit symbols TB1·TB18, each of which performs particular functions to be described in detail.

One assembly of boards, TB7 through TB13 converts the 2400-baud signals arriving at terminal T5 over the sending leg from the patron into two 1200-baud channels A and B ready for transmission into the sending legs of the transceivers MA, MB for carrier sub-channels A and B.

On the carrier side of the combiner, the transmitted outputs of the two transceivers are combined for application to a single voice frequency line by means of the pair of complementary low-pass and high-pass filters LP1, HP1. The combiner receives the 1200-baud signals from the separate receiving legs of sub-channels A and B and combines these in interleaved fashion in terminal boards TB14 through TB19 at the 2400-baud rate for retransmission into the patron's receiving leg at terminal T6. The signals received from the carrier line, however, have been subjected to attenuation and delay, both of which are non-linear with frequency. Equalization of attenuation over the band is relatively simple and is accomplished by equalizer 22. The requirements for delay compensation are more exacting inasmuch as signals of the two sub-channels bearing substantial disparity in arrival times must be combined in interleaved fashion into a single outgoing channel. In order to achieve the delay correction required delay circuit DL1 is utilized to bring the sub-channels into proper relationship. The delay circuit DL1 provides compensation for any difference in propagation time of the two low-speed bit streams between the transmitter and the receiver. The associated filters LP2 and HP2 are used so that either of the incoming signals may be selected to pass through the delay line. In order for the two streams to be properly recombined, timing is required from the synchronous data timer assembly 14 that is relative to the timing of the received bit streams. The synchonous data timer assembly 14 provides coordinated timing pulses for the signals transmitted by the patron and to be subdivided by the serial to parallel converter. It also provides a 2400-baud timing signal synchronized and phased with the incoming signals for the control of parallel to serial signal conversion in the combiner.

SYNCHRONOUS DATA TIMER ASSEMBLY

The synchronous data timer assembly 14 is a known type of apparatus. It includes a channel timing synchronizer unit and power supply. The assembly is used at both the transmitting and receiving sides of the data terminal. The synchronizer provides various timing pulses for controlling the patron's data equipment and the data channel combiner 10. The latter, in turn, controls the transceivers MA, MB associated with subchannels A and B.

At the send side, the synchronizer unit has a highly stable oscillator with a fixed countdown chain that provides two uncorrected 4800-baud square wave outputs with the negative transmission in the center of the information bit. One output is used to control the patron's send data equipment and the second output is used to control the data channel combiner 10.

At the receive side, the synchronizer unit has a two-transition phase corrector with its own variable countdown chain. An output from the highly stable oscillator is applied to the phase corrector at a frequency that is 128 times 2400 bauds (1200 c.p.s.) This signal is applied to the variable countdown chain, which divides the signal down to 4800 bauds (2400 c.p.s.) and 2400 bauds (1200 c.p.s.) to provide phase-corrected outputs to the data terminal. The phase corrector measures the time from the positive going transition of the line signal to the center of the corrected 2400-baud signal in conjunction with the negative going transition of the line signal to the center of the corrected 2400-baud signal. From these two measurements, the phase corrector derives a correction signal that will either advance or retard the variable countdown chain by one count. Successive corrections will be made for each pair of transitions in such a way as to produce a timing signal that samples in the middle of the information bit for line signals with up to 50 percent bias. Both positive and negative transitions are used so that the sampling will take place in the middle of the information bits even under biased signal conditions. The increments of correction are $\frac{1}{128}$ of an information bit for each pair of transitions. The phase corrector provides a corrected 4800-baud output with negative going transitions at the center of the information bits that are used by the patron's data receiving equipment. In addition, the synchronizer unit provides a corrected 2400-baud output that is applied the the data channel combiner, which, in turn, controls the output of the two 1200-baud transceivers MA, MB.

The arrangement and operation of the combiner and associated equipment will now be described in detail.

TRANSMITTING

Figure 3A:
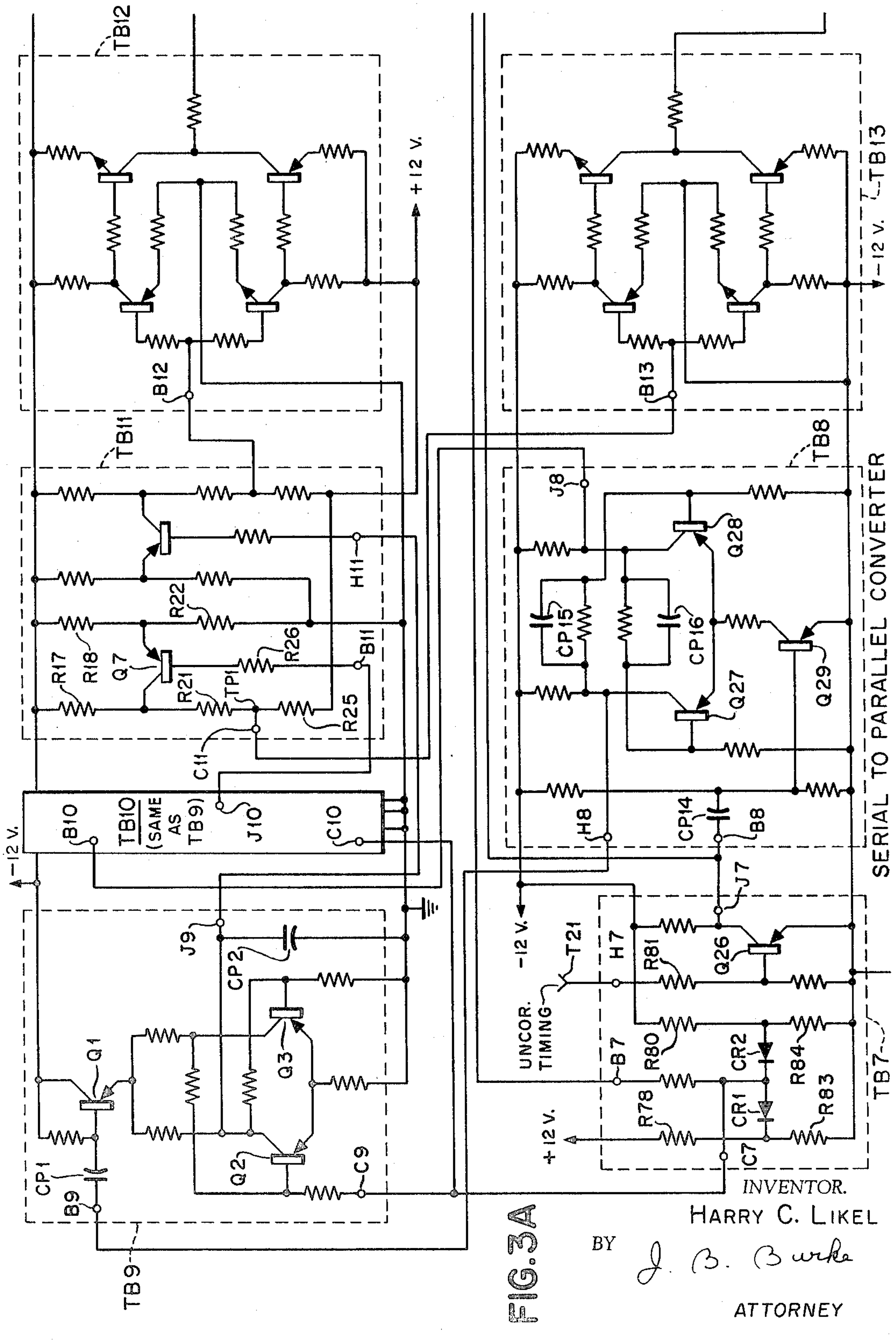
FIGS. 3A–3D are to be assembled to be read as a unit.
Figure 3B:
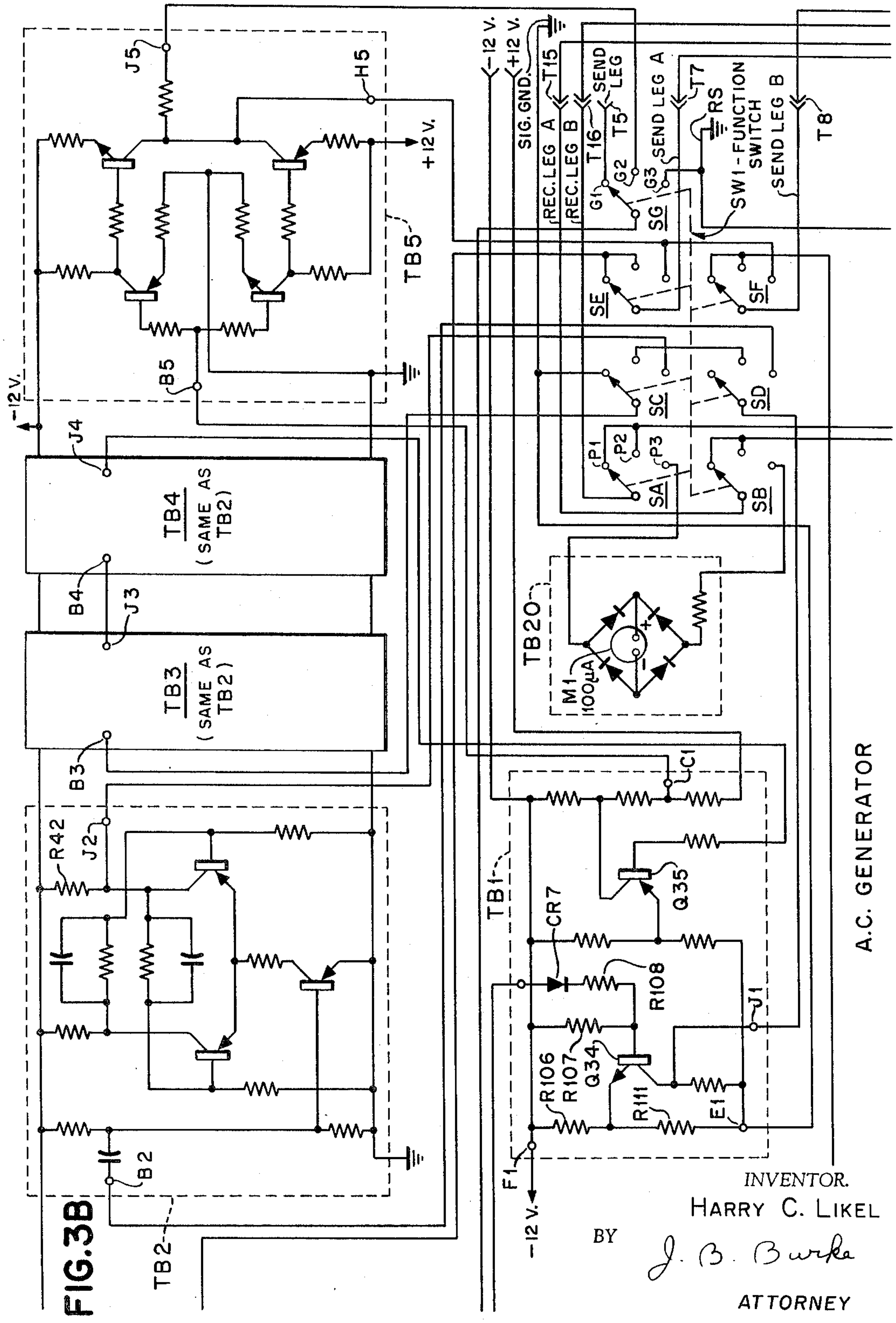
Figure 3C:
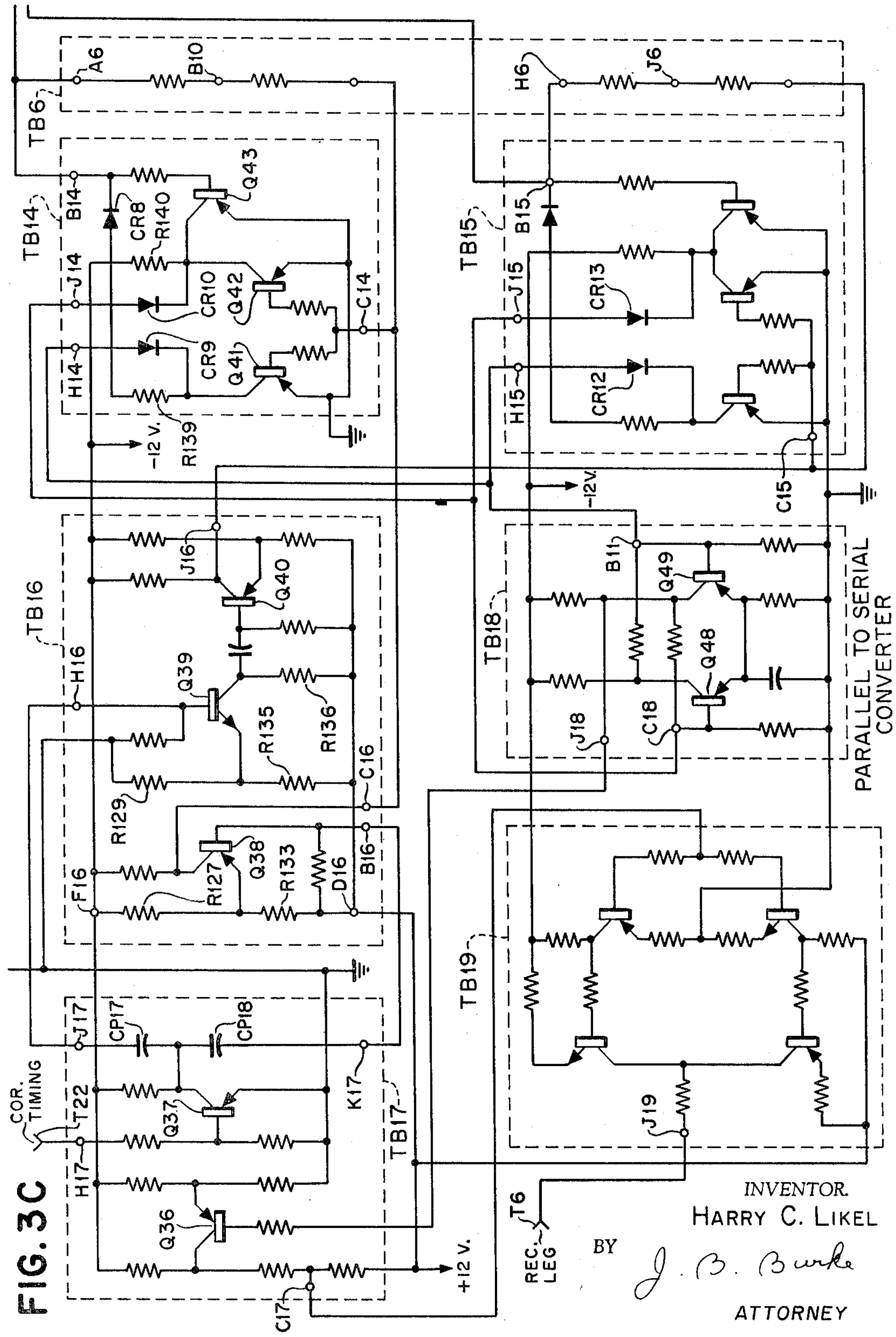

Referring to FIGS. 1 and 3A–3D, the incoming 2400-baud information stream from the patron's transmitting data equipment is applied to combiner terminal T5 marked "Send Leg" and shown at the right side of the FIG. 3B of the drawing. The return side RS of the circuit is grounded. The signal passes through contact G1 of section SG of the function switch SW1 to the arm of the section SG and then to terminal B7 of circuit or terminal board TB7 of FIG. 3A. The optimum information signal applied to terminal B7 of board TB7 is a polar square wave developing six volts R.M.S.

Terminal board TB7 contains a clipping circuit and a divider. The clipping circuit will start to clip when the potential at terminal B7 rises above the potential (1 volt, nominal) applied to diodes CR1 and CR2 by the voltage dividers consisting of resistors R78, R83, and R80, R84. Approximately ten percent of the excess above one volt of the potential applied to terminal B7 will appear in the clipped signal at terminal C7. The lowest signal input to this circuit that gives satisfactory margin for tolerances is 3 volts R.M.S. The highest signal level that may be allowed to appear at terminal B7 is 12 volts R.M.S. However, signals from sources up to 60 volts R.M.S. may be accommodated by inserting a series resistor in the output circuit of the signal source.

The clipped information signal, appearing at terminal C7 of board TB7, is connected to the terminals C9 and C10 of boards TB9 and TB10 in parallel. Terminal boards TB9 and TB10 are identical so that only board TB9 is illustrated. Boards TB9 and TB10 each contain a bistable circuit in which, if the lower left transistor Q2 is conducting, the lower right transistor Q3 is cut off and vice versa. When these circuits are turned on and have taken a "set" a change in the polarity of the potential applied at terminals C7, C9 and C10 within the limits of the output of board TB7 when operated from a proper signal source, will not cause the circuits to "turn over." However, this potential does appear in the base-emitter circuit of transistors Q2 of boards TB9 and TB10, respectively. If the current through either of the two bistable circuits employing Q2 and Q3 in the two boards TB9, TB10 is interrupted momentarily and this potential is positive (toward the base), it will make the bistable circuit take a "set" in which the particular transistor Q2 to which it is connected becomes the nonconducting transistor when current flow is resumed. If the potential is negative toward the base, this transistor will be the conducting transistor when current flow resumes.

The function of transistors Q1 in both boards TB9, TB10 is alternately to interrupt the current in their associated bistable circuits at the center of alternate information bits. Thus, one bistable circuit will take a "set" from an even numbered information bit and hold it until the next even numbered bit is sampled; the second bistable circuit takes a "set" as a result of sampling only odd numbered bits.

To cause sampling to take place as described in the preceding paragraph and at the most opportune time, that is, in the center of the information bits, it is necessary that the synchronous data timer assembly 14 supply the combiner with timing information that specifies the proper instant relative to the timing of the information bits. This is easy to obtain since the synchronous data timer assembly also times the stepping out of information bits from the data source.

In the data channel terminal, the synchronous data timer assembly 14 delivers a polar square wave to the combiner 10 at twice the information bit rate. This wave is so related to the timing wave that is supplied to the data source to step out information bits, that its negative going transition will occur at the center of the information bits.

The square wave output from the synchronous data timer assembly 14 is applied to the combiner at terminal T21 labelled "Uncor Timing" shown at board TB7 in FIG. 3A. The term "Uncorrected Timing" indicates that this wave comes directly from the timing circuit without having its frequency or phase altered by a phase corrector. The phase corrector, which is part of the synchronous data timer assembly 14, matches the speed and phase of the output of the receiving side of the synchronous data timer assembly to the speed and phase of the receive signals.

The square wave, applied at terminal H7 of board TB7, goes to the base of transistor Q26 through resistor R81. Transistor Q26 amplifies and inverts this wave, which is then connected through terminal J7 of board TB7 to terminal B8 of board TB8 and terminal H1 of board TB1, FIG. 3B. Board TB8 contains a suitable circuit similar to that of boards TB9 and TB10. Here, however, it is not necessary to control the "set" of the bistable circuit since it is unimportant which of the two possible phases the circuit falls in relative to the signal wave. It is important, however, that the bistable circuit "turn over" at the center of each information bit. This is done by applying a positive pulse to the base of transistor Q29 at the proper time. This pulse is derived from the positive-going crossover of the square wave applied at terminal B8 of board TB8 by the differentiating capacitor CP14. This crossover causes transistor Q29 to momentarily interrupt the current in the emitter circuits of transistors Q27 and Q28 that activate the bistable circuit. Because of the action of capacitors CP15 and CP16, this interruption will cause the bistable circuit to "turn over" when the current is re-established. As a result, the bistable circuit associated with board TB8 "turns over" at the information stream rate (2400 bauds) but with this crossover occurring at the center of the information bits. Two outputs are taken from this circuit; one output is taken from terminal H8 and the second output is taken from terminal J8, both of board TB8. These outputs are square waves, 180° out of phase. As a result, when there is a negative going transition at terminal H8 there is a positive going one at terminal J8 and vice versa. Terminal H8 of board TB8 is connected to terminal B9 of board TB9, and terminal J8 of TB8 board is connected to terminal B10 of board TB10. In this manner, alternate negative and positive pulses as derived by differentiating capacitors are applied to the bases of transistors Q1 in boards TB9, TB10 respectively. As in the case of transistor Q29, transistors Q1 are also normally conducting in a saturated condition so that the negative pulses cause no change. However, the positive pulses, which occur alternately at transistors Q1 interrupt the current in their associated bistable circuits, thereby allowing each transistor to take a "set" dependent upon the polarity of the information bit applied at terminals C9, C10 of boards TB9 and TB10. In this manner, the bistable circuits of boards TB9 and TB10 take alternate "sets" as determined by alternate bits in the information stream and hold the particular "set" for two bit lengths of the information stream.

The outputs from boards TB9 and TB10 are taken out at their respective terminals J9, J10. These outputs are square waves but not polar. The two values of the square wave from board TB9 are approximately −11 volts when transistor Q2 is not conducting and −1.5 volts when transistor Q2 is conducting. The values of the square wave output from board TB10 are similar. The exact values depend upon the tolerances of the components. Capacitors CP2 in both boards TB9, TB10 shunt each of these outputs to bridge the momentary breaks in the signal that occurs when either of transistors Q1 is pulsed and interrupts the current in the circuit at a time when the information signals do not require the bistable circuit to "turn over." The outputs from boards TB9 and TB10 are applied to board TB11 at terminals B11 and H11. Terminal board TB11 contains two similar circuits that converts the non-polar square wave output of boards TB9 and TB10 to polar square waves. The operation of the two circuits is similiar and will be explained relative to the left-hand one of the pair which is connected to TB10. The voltage divider consisting of resistors R18 and R22 serves to fix the voltage at the emitter to transistor Q7 at a value that lies between the two values of voltage that are applied to its base through resistor R26. Thus, when transistor Q3 of board TB10 is conducting, the base of transistor Q7 will be positive relative to its emitter, and the transistor will not conduct. Conversely, when transistor Q3 of board TB10 is not conducting, the base of transistor Q7 will be negative relative to its emitter, and the transistor will conduct. The output from this circuit is at terminal C11 and is taken from a tap TP1 on the voltage-divider consisting of resistors R17, R21 and R25 that is connected between the +12 volt and the −12 volts power supplies. This tap TP1 is electrically nearer to the negative end of the voltage divider than the positive end so that when transistor Q7 is nonconducting, it will be at a negative voltage relative to ground. However, transistor Q7 is connected to this voltage divider between the point of connection of terminal C11 and its negative end. Therefore, if transistor Q7 conducts and brings its point of connection to the voltage divider close to ground potential, terminal C11 becomes a point on a voltage divider that is connected between positive and ground, and, therefore, must be positive relative to ground. Proper selection of the constants for this circuit results in a polar output wave that is suitable for driving the circuits of terminal board TB12 or TB13.

The circuits in terminal boards TB12 and TB13 are used to product a polar output suitable for driving the modulators. These circuits, in response to a potential of one volt or more applied at their input terminals B12 or B13 will apply the voltage of the power supply, of the same polarity as that impressed at the input, to the output connection through a nominal impedance of 600 ohms. The circuits on terminal boards TB12 and TB13 are each driven by one of the two circuits of board TB11. The outputs from boards TB12 and TB13 are conducted through SE and SF sections of the FUNCTION switch SW1 when it is in either position P1 or P2 to combiner terminals T7 and T8. These terminals are marked "Send Leg A" and "Send Leg B" respectively on the drawing for brevity. The full, proper terminology is "Subchannel A, Send Leg" and "Subchannel B, Send Leg." Similar terms should be used on the receiving side.

The Send Leg A and Send Leg B outputs of the combiner are conducted by wiring to the signal input connections of the two conventional 1200-baud frequency shift keying (FSK) transceivers or "modems" MA and MB for subchannels "A" and "B." The transmitting side of the modems converts the digital information signal to a frequency shift carrier signal suitable for transmission over a voice facility. Subchannel "B" is tuned to operate in the upper half of the voice facility (2500 c.p.s. carrier frequency). In the process of converting from a digital to a frequency shift keying signal, unwanted frequencies are developed which fall outside the frequency band to be used by each modem. In order to eliminate these frequencies before they become inseparably mixed, the outputs of the two 1200-baud modems are brought back to the combiner separately for filtering before being applied in combination to the voice facility. This provides a 200-cp.s. guard band between the two channels from 1700 c.p.s. to 1900 c.p.s.

Figure 3D:
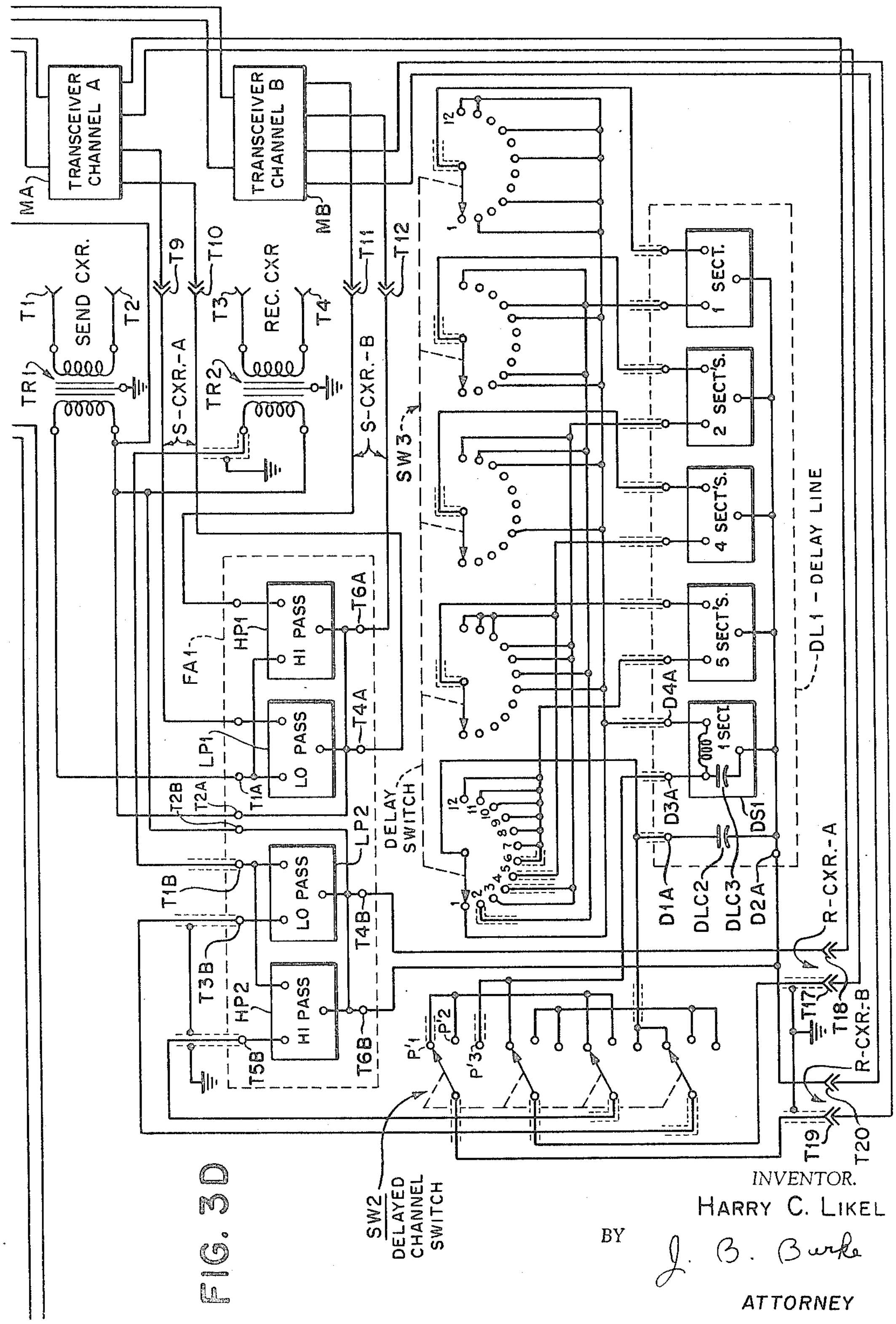

The carrier signal associated with subchannel "A" arrives at the combiner terminals T9, T10 marked "S-CXR-A," and shown at the right side of FIG. 3D of the drawing. The carrier signal associated with subchannel "B" arrives at the combiner at combiner terminals T11 and T12 marked "S-CXR-B" and shown at the right side of FIG. 3D. The circuit may be traced showing the connection of subchannel "A" to the transmitting low pass filter LP1 of filter assembly FA1 and subchannel "B" to the transmitting high pass filter HP1 of assembly FA1. It will be noted that the filters are single-ended, that is, all of the filtering action takes place in one side of the circuit, the other side of the circuit being carried through as a grounded zero impedance circuit and, therefore, requiring only one connection to the filter for both the input and output sides. The ground is picked up at contact G3 of section SG of the FUNCTION switch SW1 in position P3 Filter terminals T2A, T4A, and T6A are connected together and are common to the input and output circuit. Since the outputs of the high- and low-pass filters HP1, LP1 must be connected in parallel to combine the two signals this connection is made internally on the side of the circuit that contains the filtering, and the combined circuit is brought out at terminal T1A.

The common output circuit from filter terminals T1A and T2A is connected to the primary of the transmitting line coupling transformer TR1 and then to combiner terminals T1 and T2, marked "Send CXR" in FIG. 3D of the drawing. Transformer TR1 is a 1-to-1 transformer that isolate the circuit from ground on its secondary side.

RECEIVING

On the receiving side, the incoming carrier signal from the voice facility is applied to combiner terminals T3 and T4, marked "REC CXR" on the drawing. These terminals, in turn, are connected to the receiving line coupling transformer TR2 which reduces the incoming circuit from metallic to grounded. The secondary side of the transformer is applied to the high- and low-pass filters HP2, LP2 of the receiving side of filter assembly FA1. These filters are similar to filters HP1, LP1 used on the transmitting side and the connections are the same except reversed. The grounded side is carried through as a common connection from terminal T2B to terminals T4B and T6B. The two ungrounded sides of the filters are connected in parallel to terminal T1B on the input side. On the output side, the signal from the distant low frequency modem MA in subchannel "A" is delivered at terminal T3B and that from the distant high frequency modem MB in subchannel "B" at terminal T5B.

CHANNEL DELAY

Since the propagation time of the two signals in subchannel "A" and subchannel "B" through the transmission medium may not be the same, it is necessary to delay the signal that arrives earlier until it is in the same relative position to the other as it was at the transmitter. This is accomplished by a delay line DL1 which is adjustable in twelve 50-microsecond steps from 50 microseconds to 600 microseconds, and is switched so as to be in series with either subchannel "A" or subchannel "B." This switching is accomplished by DELAYED CHANNEL switch SW2 of the combiner. It will be noted that one side of the delay line, terminal D2A is grounded and, therefore, is common with the grounded side of the receiving filters HP2, LP2. Further, it should be noted that the grounded side of the low-pass filter LP2 at terminal T4B is connected to combiner terminal T18 and terminal T6B of the high-pass filter HP2 is connected to combiner terminal T20. These are the grounded sides of the circuits that feed the two 1200-baud frequency shift keying signals to the receiving sides of the modems MA, MB. Combiner terminals T17 and T19 are the high sides of these circuits that pass through the DELAYED CHANNEL switch SW2. When the switch is in position P'1, the delay line is in subchannel "A," the low frequency channel. With the DELAY SWITCH in the position shown on the drawing, the circuit may be traced from the filter assembly FA1 through the switch SW2 to input terminal D4A of a single delay section DS1 of the delay line. The circuit then goes from output terminal D3A of this section through the DELAYED CHANNEL switch SW2 to combiner terminal T17. The delay line employs capacitors at the input and output each having a value of one half that used in the interior of the sections. These capacitors are shown connected between ground and delay line terminals D1A and D3A. It will be noted that the circuitry of the DELAY switch is such that the capacitor DLC2 connected to terminal D1A will always be at the input end of the line, and the capacitor DLC3 connected to terminal D3A will always be at the output end of the line.

In DELAY switch SW3 the number of delay sections between terminals D1A and D3A is equal to the position number to which the switch is set. In addition, with the DELAYED CHANNEL switch SW2 in position P'1, the delay line DL1 is in subchannel "A." When it is in position P'2, the circuits are carried through without either subchannel being connected to the delay line DL1. When switch SW2 is in position P'3, the delay line DL1 is in subchannel "B." Assuming the delay line DL1 has been correctly set, the "A" and "B" subchannel signals are sent to the transceivers or modems MA, MB through combiner terminals T19 and T20, marked "R-CXR-B," and terminals T17 and T18, marked "R-CXR-A" in FIG. 3D. The carrier signals are demodulated by the modems MA, MB and sent back to the combiner as polar square wave digital signals. These signals are on grounded circuits and arrive at the combiner at terminals T15 and T16, marked "Rec. Leg A" and "Rec. Leg B." These signals are duplicates of the signals delivered by the combiner in the distant terminal at its "SEND LEG A" and "SEND LEG B" terminals T7 and T8 except for such changes as are inherent in the transmission process. The two circuits are carried from terminals T15 and T16 through the sections SA and SB of the FUNCTION switch SW1 when it is in position P1 or P2 to terminal B14 of board TB14 and terminal B15 of board TB15, respectively, and to terminals A6 and H6 of board TB6 in the same order. Terminal boards TB14 and TB15 contain gate circuits for REC. LEG A and REC. LEG B inputs. These gate circuits act under the control of the receive leg signals and the timing pulses applied at the C14, C15 terminals of the gate circuits. These timing pulses are derived from a corrected 2400-baud polar square wave provided by the synchronous data timer assembly 14. The synchronous data timer assembly 14 is fed signals from the receiving leg of subchannel "A" in parallel with the combiner. From these signals, the corrector circuits of the synchronous data timer assembly 14 derive information to adjust the phase of the timing wave so that the positive going transition will be at the center of the information bit of the circuit to which it is connected, subchannel "A" receive leg in this case. This puts the negative going transitions in the center of the information bits in subchannel "B" receive leg. When there is a difference between the frequencies at the transmitting and receiving terminal, the constant adjustment of the phase by the corrector at the receiving terminal represents a change in its frequency to match that of the transmitter. The timing wave from the corrector of the synchronous data timer assembly 14 is brought in on combiner terminal T22, which is marked COR. TIMING at the left in FIG. 5A. The timing wave is then brought to terminal H17 of board TB17 where it drives transistor Q37 which operates as an amplifier that is saturated during the negative half cycle and cut off during the positive half cycle of the applied wave. The output from transistor Q37 is taken from terminals J17 and K17 through differentiating capacitors CP17 and CP18. This output is in the form of sharp spikes, a negative going one appearing each time the timing wave makes a positive going transition and a positive going one each time the timing wave makes a negative going transition. The output from terminal J17 of board TB17 is applied to terminal H16 of board TB16 and the output from terminal K17 of board TB17 is applied to terminal B16 of board TB16. Transistor Q38 acts as a Class C amplifier and is connected between the positive 12 volt and negative 12 volt supplies. Normally, the transistor is cut off by the nominal 2.2-volt drop across resistor R133 which, with resistor R127, forms a voltage divider between the +12 v. and −12 v. points D16 and F16 of board TB16. However, when a negative pulse from transistor Q37 drives the base of transistor Q38 negative relative to its emitter, transistor Q38 conducts in a saturated manner and its output at terminal C16 becomes positive momentarily. Terminal C16 of board TB16 is connected to terminal C14 of board TB14 and feeds the bases of transistors Q41 and Q42. These transistors together with auxiliary transistor Q43 are the gate transistors for "REC. LEG A." Transistors Q41 and Q42 are cut off momentarily by the pulse at terminal C14 at the instant the corrector in the timer assembly 14 determines to be the center of the information pulses associated with REC. LEG "A." Terminal board TB15, which has a circuit similar to that of board TB14, is the subchannel "B" receive leg gate and requires a momentarily positive potential at its terminal C15 at the instant that the 2400-baud corrected timing wave makes a negative going transition. As described above, at this instant, transistor Q37 causes a positive going pulse to appear at terminal J17 of board TB17. This pulse is applied to the base of transistor Q39 which is an NPN transistor operating in a Class C circuit. The transistor is normally non-conducting because of the bias developed across resistor R129 which, with resistor R135, forms a voltage divider across the negative power supply. Since transistor Q39 normally is non-conducting, there is no voltage drop across resistor R136 and the collector of transistor Q39 is at the potential of the positive power supply. However, when a positive pulse is applied at its base, the transistor conducts in a saturated manner and its collector potential changes momentarily to near that of the negative power supply. This produces a negative pulse at the base of transistor Q40, which is a Class C amplifier similar to transistor Q38. Transistor Q40 now performs the same service for board TB15 that transistor Q38 did for board TB14 except that it adjusts the phase at the center of the information bits in subchannel "B."

The gate circuits use the information relative to the subchannel signal and the timing pulses to control the bistable circuit of board TB18 in the following manner: As already noted, the leg signal from the modem MA associated with subchannel "A" is applied to terminal B14 of board TB14. Except at the instant of sampling, that is, when the timing pulse is applied at terminal C14, the input circuits of transistors Q41 and Q42 are conducting. If the signal applies negative potential at terminal B14 transistor Q43 is saturated and negative potential is applied through diode CR8 and resistor R139 to the collector of transistor Q41 which will remain near ground potential. The collectors of transistors Q42 and Q43 are connected to the negative supply through resistor R140 and also remain near ground potential. When the timing pulse appears, conduction through transistors Q41 and Q42 will cease momentarily, but the collector of transistor Q42 will remain at ground potential because of the saturation of transistor Q43. As a result, negative potential applied by the signal at terminal B14 will be conducted through diode CR8, resistor R139, and diode CR9 to terminal H15 of board TB15 and terminal B18 of board TB18. None of this pulse is lost in the circuitry of board TB15 since diode CR12 will not conduct in this direction. However, at board TB18, where it is applied to the base of transistor Q49, one of the transistors which activates the bistable circuit, it will cause this transistor to become the conducting member of the pair.

Terminal J14 of board TB14 is connected to terminal J15 of board TB15 and terminal C18 of board TB18. Terminal C18, in turn, is connected to the base of transistor Q48, the second activating transistor of the bistable circuit. However, no pulse comes over this connection to interfere with the "set" given the bistable circuit by the pulse from terminal H14 of board TB14 since, although the current was interrupted in transistor Q42 by the timing pulse, it merely transferred momentarily to Q43, which is in parallel with it, and is held conducting by the negative signal.

If the signal applied at terminal B14 is of positive polarity, transistor Q43 will not conduct and, because of the action of diode CR8, no potential will appear at the collector of transistor Q41. Transistor Q42 will be strongly conducting, keeping its collector near ground potential until transistor Q42 is cut off by the timing pulse, whereupon, negative potential will be momentarily applied from the 12 volts power supply through resistor R140, diode CR10, and terminal J14 to terminal J15 of board TB15 and terminal C18 of board TB18. As before, the circuitry of board TB15 will not absorb any of the power of the pulse since diode CR13 will not conduct it. At board TB18, the negative pulse will be applied at the base of transistor Q48 and will render it the conducting member of the bistable pair. In this manner, when a positive signal is sampled, the circuit of board TB18 takes a "set" opposite to the one it takes when a negative signal is sampled. In addition, since the action of the circuits of board TB15 is exactly the same for subchannel "B" Receive Leg as that of board TB14 for subchannel "A" Receive Leg and, since they both act on the circuits associated with board TB18 in parallel, and, further, since the timing pulses are supplied to TB14 and TB15 alternately, the "set" of TB18 will be controlled alternately by subchannels "A" and "B." When the "set" is due to a positive signal being sampled, the output at terminal J18 of board TB18 will be near the negative power supply potential. This makes the base of transistor Q36 in board TB17 negative relative to its emitter, and the transistor conducts. When a positive signal is sampled, the potential applied at the base of transistor Q36 renders the transistor nonconducting. This action causes a polar signal to be developed at terminal C17 of board TB17 in the same manner as previously described for the two circuits of board TB11. This polar output is amplified and clipped by the circuitry associated with board TB19 and delivered at terminal J19 as a polar square wave. This wave is conducted from the combiner through combiner terminal T6, shown at the left in FIG. 3C and marked "REC. LEG." Except for any errors, the wave will be a duplicate of the send leg signal applied to combiner terminal T5 at the distant terminal.

TESTING

Subchannels "A" and "B" of the data terminal transmit alternate bits of the 2400-baud information stream. If this stream is alternately marking and spacing, one subchannel will send steady marking and the other steady spacing. This is of little value in aligning the equipment or checking the circuit for trouble. In order to have each channel send alternate mark and space pulses at a 1200-baud rate, it is necessary to supply the combiner with a signal at the 1200-baud input, that is, two marks followed by two spaces, etc. Since it is unlikely that such a signal would normally be available for test purposes, provision has been made in the combiner to provide the necessary signal. To obtain this signal, the FUNCTION switch SW1 on the combiner should be set to the third position P3. The desired frequency is derived from the Uncorrected Timing at 4800 bauds brought into the combiner at terminal T21, shown at the left of FIG. 5A. This input is applied to transistor Q26 of terminal board TB7. The output of transistor Q26, which appears at terminal J7 of board TB7, is applied to terminal B8 of board TB8 (the circuit operation of which has been described above), and to terminal H1 of board TB1. The signal is then connected through diode CR7 and resistor R108 to the base of NPN transistor Q34. Transistor Q34 is biased so as to be normally cut off by the potential developed across resistor R106, which, with resistor R111 forms a potential divider between the —12 volt supply applied at terminal F1 and ground applied at terminal E1. When transistor Q26 is conducting, its collector goes very close to ground potential; the potential at terminal H1 of board TB1 is positive relative to the emitter of transistor Q34. Current then flows to the base of transistor Q34 through diode CR7 and resistor R108, causing the transistor to conduct in a saturated manner. As a result, the collector of transistor Q34 reaches a potential of approximately —10 v. When transistor Q26 is nonconducting, its collector reaches —12 volts which is applied to terminal H1 of board TB1. Except for diode CR7, this potential would meet the —12 v. potential already applied to the base of transistor Q34 through resistor R107, which, in itself, cuts off transistor Q34. Therefore, the negative potential at terminal H1 is not needed. Diode CR7 is included so that should transistor Q3 in board TB9 short circuit, the output of transistor Q26 would not be materially affected and the operation of the serial-to-parallel converter could continue. In addition, as a result of using diode CR7 and making transistor Q34 an NPN transistor, Q34 does not load transistor Q26 on the negative going transitions, thereby detracting from the sharpness of the negative pulse supplied to transistor Q29 in board TB16. At the same time, transistor Q3 develops its negative transition on the positive going transition of transistor Q26, and, therefore, does not have its sharpness reduced by the load of transistor Q29.

The output of transistor Q34, which is still a 4800-baud square wave, appears at terminal J1 of board TB1 and is applied to the arm of section SD of the FUNCTION switch SW1. With the FUNCTION switch SW1 in the position P2 or test position, the signal is carried from the second contact of section SD of the FUNCTION switch SW1 to the first contact of section SC where it is picked up by the section arm of section SC and applied to terminal B3 of board TB3. Terminal boards TB2, TB3, and TB4 each consists of a bistable circuit similar to board TB8 described above and like board TB8, each board reverses its "set" each time it experiences a positive going transition at its terminals B2, B3 or B4. The output of board TB3, which is a 2400-baud square wave, appears at terminal J3 of board TB3 and is applied to terminal B4 of board TB4. Board TB4 is identical to board TB3 and reduces the frequency to 1200 bauds. The output of board TB4, which is at terminal J4 is conducted to terminal B1 of TB1 where the circuitry of transistor Q35 converts it to a polar wave in the manner described above for the two similar circuits of board TB11. The output of transistor Q35 is taken from terminal C1 of board TB1 to terminal B5 of board TB5 where it activates a polar drive circuit. The output of the drive circuit appears at terminal J5 of board TB5 and is then applied to the second terminal of section SG of the FUNCTION switch SW1. With the FUNCTION switch in the second or test position, the signal is picked up by the arm of the switch and connected to the information input circuits of the combiner in place of the sending leg. In this manner, the requirement that the test position send alternating current on both the "A" and "B" subchannel modems MA, MB is fulfilled.

ALIGNMENT

It is necessary to check the alignment of the two subchannels of a terminal each time a different voice facility is used to connect it to a distant terminal. To do this, the FUNCTION switch SW1 at each terminal is set in the third position P3 which is the aligning position. The 4800-baud uncorrected timing signal is then picked up from terminal J1 of board TB1 and conducted to the arm of section SD of the FUNCTION switch SW1 as in the test operation described above. However, with the switch SW1 in the aligning position, the circuit is completed through the third contact section SD to terminal B2 of board TB2. The circuitry of board TB2 reduces the frequency of the signal to 2400 bauds and delivers it at terminal J2. The signal is then conducted through the third contact of section SC of FUNCTION switch SW1 and the switch arm to the terminal B3 of board TB3 where the frequency is reduced to 1200 bauds. Terminal board TB3 is connected to board TB4 where the frequency is reduced to 600 bauds. This output then goes through the circuitry of boards TB1 and TB5 where it is picked up at terminal H5 as a 600-baud polar square wave. The connection is made to terminal H5 of board TB5 rather than terminal J5 to eliminate resistor R42 in board TB2 from the circuit, thereby supplying the extra current needed to drive both modems MA, MB in parallel. The output from terminal H5 of board TB5 is conducted to the third contacts of sections SE and SF of the FUNCTION switch SW1 where it is carried through the switch arms and applied to the send legs associated with subchannels "A" and "B" in parallel. At the receiving end of the circuit, the two signals from the modems MA, MB are delivered at receive terminals T15, T16. If the transmission time is the same for both subchannels from the input of the transmitting side of the distant modems to the output of the receiving side of the local modems, the two outputs would be exactly in phase. Since both modems are driven from the same power supplies and, with the FUNCTION switch SW1 in the aligning position, have no appreciable load connected to their outputs, the potentials will be exactly alike. As a result, the sensitive meter M1 in the circuit of board TB20, which is connected through the third terminal of the sections SA and SB of the FUNCTION switch SW4 to the receive legs associated with subchannels "A" and "B" will have the same polarity at each of its terminals and will read zero. However, this situation is unlikely to occur for two reasons: first, the transmission time for the two subchannels ordinarily will not be the same; and, second, even if it were non-uniform, displacement to the crossover in the two channels due to noise would result in occasions when the polarity in one receive leg would momentarily be opposite that in the other leg. Since the circuit of the meter is of the full-wave rectifier type, when the polarity in one receive leg is opposite to the polarity in the other, the meter will deflect, the deflection being in proportion to the time the two subchannels apply different polarities at the terminals of the meter. Ordinarily, when the data terminals are set in the align condition, the meter will read up scale. The DELAYED CHANNEL switch SW2 should be operated to position P'1 for subchannel "A" and to position P'2 for subchannel "B," with the delay switch SW3 set in position "1". If the insertion of delay in first one and then the other subchannel causes an increase in the meter reading in both cases, then the two subchannels are actually in phase without inserted delay, and the meter reading is due to the effects of noise or bias. However, it is probable that the meter reading will increase with the insertion of delay in one subchannel and decrease when it is inserted in the other. The DELAYED CHANNEL switch SW2 should be left in the position P'1 or P'2 (A or B) that causes the meter reading to decrease and the DELAY switch SW3 should be adjusted until the lowest possible reading is obtained. If this reading does not fall in the lower quarter of the meter scale, the terminals should be checked for bias and the voice facility should be checked for noise.

It should be noted that the maximum delay of which the delay line is capable is 600 microseconds. This is more than should be encountered as a differential delay between the subchannels when operated over a suitable voice facility. Since the bits that are said to determine alignment are of 1667 microseconds each, substantially more than twice the length of the maximum displacement to be expected, the method of alignment described in these paragraphs will never be ambiguous.

TRANSCEIVER

FIG. 4 shows in block diagram form the arrangement of transceiver MA as used in association with combiner 10. The transceiver is similar to transceiver MB so that only one of the two transceivers is described here.

In the transmitter portion of the transceiver is an input keyer circuit 60 connected to a frequency shift oscillator 62. The output of the oscillator 62 is applied to a band-pass filter 66 via a buffer amplifier 64. The filter is connected to a send modulator 68 whose output is applied to a send amplifier 72 via a low-pass filter 70.

Translation oscillator 74 is connected to power amplifier 76. This amplifier isolates the oscillator 62 from oscillator 74. The output of amplifier 76 is applied to the send modulator 68 and receive modulator 80.

In the receiver portion of the transceiver is a receive amplifier 78 connected to the carrier line. The amplifier 78 is connected to receive modulator 80 which has its output connected to filters 82, 84, delay corrector 86, limiter 88 and discriminator 90 in turn. The output of the discriminator is applied to a post detection amplifier 92 connected to the receive leg of the combiner.

The output of the combiner 10 consists of two 1200-baud data streams that are sent alternately to the transceivers associated with subchannels "A" and "B." When the oscillator 62 is in operation and a marking signal (negative voltage) is received at the keyer circuit, the oscillator frequency output is lowered by 400 cycles per second from its mid-frequency. When a spacing signal (positive voltage) is received, the oscillator frequency output is increased by 400 cycles per second. The output of the oscillator 62 is applied to buffer amplifier 64 which isolates the oscillator circuit from filter 66.

Filter 66 is a band-pass filter which eliminates higher order sidebands from the signal received from the buffer amplifier and passes the restricted band signals to the send modulator 68.

The translation oscillator 74 is a conventional push-pull type having a square wave output. The translation oscillator in transceiver MA associated with subchannel "A" is adjusted to produce a signal of 8600 cycles per second. This signal is required to translate a carrier of 7500 cycles per second down to 1100 cycles per second. The translation oscillator in transceiver MB of subchannel "B" is adjusted to produce a signal of 10,000 cycles per second. This frequency is required to translate the 7500-cycle per second carrier down to 2500 cycles per second.

The power amplifier 76 isolates the oscillator 74 from its output load. The output of the oscillator 74 is applied via amplifier 76 to the send modulator 68 and receive modulator 80. Send modulator 68 combines the frequencies from the frequency shift oscillator and the translation oscillator and applies the difference frequencies to the filter 70. In subchannel "A" a difference frequency of 1100 cycles per second and its sidebands appear at the output of filter 70. In subchannel "B" a difference frequency of 2500 cycles per second and its sidebands appear at the output of filter 70.

Send amplifier 72 amplifies the signal derived from filter 70 to a predetermined maximum level and applies it to the combiner carrier line. The outputs of both transceivers MA, MB are returned separately to the combiner 10 which filters the signal before it is applied in combination to the voice frequency facility.

The receive amplifier 78 amplifies the signal obtained from the combiner 10. The output of amplifier 78 is applied to the input of receive modulator 80. Receive modulator 80 accomplishes frequency translation in conventional manner. It is also driven by power amplifier 76 which applies the signal generated by the translation oscillator 74. The output of the receive modulator is the difference frequency between that of the translation oscillator and the received carrier frequency. In subchannel "A" this difference frequency is 7500 cycles per second, since the translation oscillator frequency is 8600 c.p.s. and the carrier frequency is 1100 c.p.s. In subchannel "B" this difference frequency is 7500 cycles per second, and is derived by combining the frequency of the carrier (2500 c.p.s.) with the frequency of the translation oscillator (10,000 c.p.s.). The difference frequency of 7500 cycles per second in both cases is the original carrier frequency generated by the frequency shift oscillator 62.

The output of modulator 80 is applied to a band-pass filter 82 which suppresses the upper order sideband from the receiver modulator and passes the desired lower order sideband (7500 c.p.s.). The next filter 84 suppresses the translation oscillator frequency. The delay correction network 86 equalizes the delay distortion introduced by filters 84, 86 and other components in the system.

Limiter 88 receives the filtered signals from filter 84. The limiter raises the incoming signal level to a level required to drive the discriminator 90 and removes any amplitude modulation from the frequency modulated signal.

Discriminator 90 produces a variable voltage output whose zero voltage output comes at mid-frequency and whose positive and negative voltage peaks occur at 600 cycles per second above and below mid-frequency. The output of the discriminator is applied to a post-detection amplifier 92.

Amplifier 92 amplifies and limits the direct current signals derived from the discriminator and produces a polar signal output. A positive potential resulting from spacing frequency applied to the modem results in positive voltage applied at the output of the amplifier to the receive leg of the combiner. A negative potential resulting from marking frequency applied to the modem results in negative voltage being applied to the receive leg of the combiner.

While the invention has been explained in connection with a communications system involving certain specific baud rates, it will be apparent to those skilled in the art that the principles of the invention are equally applicable to systems employing other baud rates.

What is claimed and sought to be protected by Letters Patent is:

1. In a dual channel communications system for transmission and reception of coded signals, the combination comprising:

(a) a source of binary coded signals;

(b) a synchronous data timer means for supplying timing pulses to said source of binary coded signals to cause the binary coded signals to be stepped out at a predetermined fixed bit rate;

(c) signal divider means;

(d) means for applying the binary coded signals to said signal divider means to derive therefrom two separate binary coded signal bit streams each having one half of said fixed bit rate;

(e) two transceivers in the dual channels respectively, said transceivers having:

(1) signal modulators for modulating the two binary coded signal bit streams on carriers in upper and lower halves of a voice frequency band, and (2) signal demodulators for demodulating received modulated signals into two binary bit streams;

(f) delay means in circuit with the demodulators for equalizing the time of arrival of signals in both half bandwidths at the demodulators; and (g) alignment means in circuit with the transceivers for determining the time delay required in signals in one channel to equalize the time of arrival of signals at the demodulators in both channels.

2. In a dual channel communcations system, the combination recited in claim 1, wherein said alignment means comprises:

(a) binary dividing circuit means connected to the data timer and to the modulators so that the modulators produce binary monitoring signals;

(b) means for applying said monitoring signals to the demodulators; and (c) metering means connected in circuit with the demodulators and responsive to reception of said monitoring signals by the demodulators to provide indications proportional to lengths of time intervals when corresponding modulated carrier signals arrive at the demodulators at different times, whereby there is determined the amount of time delay required in signal transmission in one channel to equalize the time of arrival of modulated carrier signals at both modulators.

References Cited by the Examiner

UNITED STATES PATENTS 3,159,720 12/1964 Bergmann et al. ---- 179—15.55
3,206,677 9/1965 Wier ------------- 178—66 X DAVID G. REDINBAUGH, *Primary Examiner.*

J. T. STRATMAN, *Assistant Examiner.*